(12) United States Patent
Reeve et al.

(10) Patent No.: US 11,487,602 B2
(45) Date of Patent: Nov. 1, 2022

(54) MULTI-TENANT INTEGRATION ENVIRONMENT

(71) Applicant: International Business Machines Corporation, Armonk, NY (US)

(72) Inventors: John Anthony Reeve, Winchester (GB); Benjamin Graham Thompson, Eastleigh (GB); John Hosie, Eastleigh (GB); Alasdair John Paton, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/201,010

(22) Filed: Mar. 15, 2021

(65) Prior Publication Data
US 2022/0291987 A1 Sep. 15, 2022

(51) Int. Cl.
*G06F 11/07* (2006.01)

(52) U.S. Cl.
CPC ...... *G06F 11/0784* (2013.01); *G06F 11/0709* (2013.01); *G06F 11/0772* (2013.01); *G06F 11/0781* (2013.01); *G06F 11/0787* (2013.01); *G06F 11/0793* (2013.01)

(58) Field of Classification Search
CPC ............. G06F 11/0784; G06F 11/0709; G06F 11/0772; G06F 11/0781; G06F 11/0787; G06F 11/0793
See application file for complete search history.

(56) References Cited

U.S. PATENT DOCUMENTS

| | | | | |
|---|---|---|---|---|
| 6,708,333 | B1* | 3/2004 | Glerum | G06F 11/0781 717/176 |
| 7,890,814 | B2* | 2/2011 | Zhang | G06F 11/366 714/48 |
| 11,237,895 | B2* | 2/2022 | Goodsitt | G06F 11/3636 |
| 2016/0041896 | A1 | 2/2016 | Michel et al. | |
| 2018/0060225 | A1 | 3/2018 | Tao | |
| 2018/0293158 | A1 | 10/2018 | Baughman et al. | |
| 2020/0201706 | A1 | 6/2020 | M. et al. | |
| 2021/0383170 | A1* | 12/2021 | Alshawabkeh | G06N 3/0454 |

OTHER PUBLICATIONS

Deepcode, "Knowledge Base: Getting started with DeepCode," https://www.deepcode.ai/docs/Overview%252F, printed Dec. 3, 2020, 2 pgs.

(Continued)

*Primary Examiner* — Nadeem Iqbal
(74) *Attorney, Agent, or Firm* — Kelli D. Morin (57) ABSTRACT

A computer-implemented method for a multi-tenant integration environment includes, in response to an error occurring during a state of execution of an integration flow, generating error data for the error. The method further includes associating the generated error data with the error. The method further includes storing the generated error data in a data storage component. The generated error data includes (i) error state information corresponding to the state of execution of the integration flow and (ii) target state information corresponding to a target state of execution of the integration flow.

20 Claims, 6 Drawing Sheets

(56) References Cited

OTHER PUBLICATIONS

Glerum, K. "Debugging in the (very) large," https://dl.acm.org/doi/101145/1629575.1629586, SOSP '09 Proceedings of the ACM SIGOPS 22nd symposium on Operating systems principles, Oct. 2009, 5 pgs.

Mell et al., "The NIST Definition of Cloud Computing," Recommendations of the National Institute of Standards and Technology, U.S. Department of Commerce, Special Publication 800-145, Sep. 2011, 7 pgs.

Techcrunch, "Ubisoft and Mozilla team up to develop Clever-Commit, an AI coding assistant," https://techcrunch.com/2019/02/12/ubisoft-and-mozilla-team-up-to-develop-clever-commit-an-ai-coding-assistant/, printed Dec. 3, 2020, 8 pgs.

Ubuntu Wiki, "ErrorTracker," https://wiki.ubuntu.com/ErrorTracker, printed Dec. 3, 2020, 25 pgs.

Youtube, "Commit Assistant—EN," https://www.youtube.com/watch?v=I5C4FUvDyCc, printed Dec. 3, 2020, 1 pg.

Zhang, S., "Effective Program Analyses for Automated Software Testing and Error Diagnosis," https://digital.lib.washington.edu/researchworks/handle/1773/27222, printed Dec. 3, 2020, 2 pgs.

\* cited by examiner

MULTI-TENANT INTEGRATION ENVIRONMENT

BACKGROUND

The present disclosure relates to multi-tenant integration environments, and more particularly, to errors in integration flows of multi-tenant integration environments.

Integration of applications and services typically involves: (i) configuring a flow (otherwise referred to as an 'application flow' or 'integration flow'), which describes the flow of data between applications and the processing performed on data inputs and outputs; and then (ii) parsing and transforming the data to a format that is consumable by another application or service. Such flows are typically stored as a flow document in a format such as eXtensible Markup Language (XML), JavaScript Object Notation (JSON), YAML Ain't Markup Language (YAML) and can be interpreted by a particular runtime as a set of instructions (where each discrete set of instructions is called a node) for interacting with other systems. The flows are configured by connecting together a sequence of nodes, each of which is tailored to perform a particular task (e.g., transform, filter, aggregate, etc.). An integration product of an on-premise or off-premise platform then processes the data as specified by the flow.

On-premise platforms are well-established and considered to provide a good level of security because data is stored and handled internally, e.g., within an internal private network. Off-premise platforms (such as cloud computing resources) are a relatively recent and evolving concept. Generally, reference to off-premise resources or platforms refers to a concept for enabling ubiquitous, convenient, and on-demand access via the Internet to shared pools of configurable off-premise (e.g., remotely located) computing resources such as networks, applications, servers, storages, applications, functionalities, and the like, which are accessible via the Internet. Conversely, reference to on-premise resources or platforms generally refers to a concept of local or private computing resources such as networks, servers, storage devices, application, etc. that are situated locally or within/behind a virtual boundary (often behind a firewall).

In a large integration product that has vast quantities of functions in the form of connectivity to hundreds of different systems, it is impossible to undertake and/or complete comprehensive system testing of all aspects. In particular, it is difficult to truly simulate a proper customer setup of end systems in a simplified test environment. Also, many functions may remain un-used or be used only infrequently over long periods of time, thus leaving them difficult to test and/or support.

SUMMARY

According to an embodiment of the present disclosure, there is provided a computer-implemented method for a multi-tenant integration environment. The method includes, in response to an error occurring during a state of execution of an integration flow, generating error data for the error. The method further includes associating the generated error data with the error. The method further includes storing the generated error data in a data storage component. The generated error data comprises: (i) error state information corresponding to the state of execution of the integration flow; and (ii) target state information corresponding to a target state of execution of the integration flow.

According to another aspect of the disclosure, there is provided a computer program product for a multi-tenant integration environment. The computer program product comprises a computer readable storage medium having program instructions embodied therewith, and the program instructions are executable by a processing unit to cause the processing unit to perform a method. The method comprises, responsive to the occurrence of an error during a state of execution of an integration flow, generating error data for the error. The method also comprises associating the error data with the error and storing the error data in a data storage component. The generated error data comprises: (i) error state information corresponding to the state of execution of the flow; and (ii) target state information corresponding to a target state of execution of the integration flow.

According to another embodiment of the disclosure, there is provided a computer-implemented method for error-handling in a multi-tenant integration environment. The method comprises, responsive to the occurrence of an error during a state of execution of an integration flow, identifying the error and the state of execution of the flow. The method also comprises obtaining historical error data associated with a previous occurrence of the identified error. The historical error data comprises: (i) error state information corresponding to the state of execution of the integration flow at the previous occurrence of the identified error; and (ii) target state information corresponding to a target state of execution of the integration flow. The method further comprises analyzing the obtained historical error data based on the state of execution of the flow. The method yet further comprises categorizing the error into at least one of plurality of error categories based on the analysis results.

According to yet another aspect of the present disclosure, there is provided a computer program product for error-handling in a multi-tenant integration environment. The computer program product comprises a computer readable storage medium having program instructions embodied therewith. The program instructions are executable by a processing unit to cause the processing unit to perform a method. The method comprises, responsive to the occurrence of an error during a state of execution of an integration flow, identifying the error and the state of execution of the flow. The method also comprises obtaining historical error data associated with a previous occurrence of the identified error. The historical error data comprises error state information corresponding to the state of execution of the integration flow at the previous occurrence of the identified error and target state information corresponding to a target state of execution of the integration flow. The method further comprises analyzing the obtained historical error data based on the state of execution of the flow. The method yet further comprises categorizing the error into at least one of plurality of error categories based on the analysis results.

According to a further aspect of the present disclosure, there is provided an apparatus for a multi-tenant integration environment. The apparatus comprises a data generation component configured, responsive to the occurrence of an error during a state of execution of an integration flow, to generate error data for the error. The apparatus also comprises an association component configured to associate the error data with the error. The apparatus also comprises a data storage component configured to store the error data. The error data comprises error state information corresponding to the state of execution of the flow and target state information corresponding to a target state of execution of the integration flow.

According to yet another aspect of the present disclosure, there is provided an apparatus for error-handling in a multi-tenant integration environment. The apparatus comprises an error analysis component configured, responsive to the occurrence of an error during a state of execution of an integration flow, to identify the error and the state of execution of the flow. The apparatus also comprises an interface component configured to obtain historical error data associated with a previous occurrence of the identified error. The historical error data comprises error state information corresponding to the state of execution of the integration flow at the previous occurrence of the identified error and target state information corresponding to a target state of execution of the integration flow. The apparatus yet further comprises an analysis component configured to analyze the obtained historical error data based on the state of execution of the flow and to categorize the error into at least one of plurality of error categories based on the analysis results.

These and other aspects of the present disclosure will be apparent from and elucidated with reference to the embodiment(s) described hereinafter.

BRIEF DESCRIPTION OF THE DRAWINGS

For a better understanding of the preferred embodiments of the present disclosure, and to show more clearly how it may be carried into effect, reference will now be made, by way of example only, to the accompanying drawings.

DETAILED DESCRIPTION

The preferred embodiments will be described with reference to the Figures. It should be understood that the Figures are merely schematic and are not drawn to scale. It should also be understood that the same reference numerals are used throughout the Figures to indicate the same or similar parts.

In the context of the present application, where embodiments of the present disclosure comprise a method, it should be understood that such a method may be a process for execution by a computer. In other words, such a method may be a computer-implementable method. The various operations of the method may therefore reflect actions performed by various parts of a computer program. For example, various operations of the method may reflect actions performed by various parts of one or more algorithms.

According to proposed embodiments, there is provided a method, computer program product, and/or apparatus for generating data that may assist in the handling of errors in a multi-tenant integration environment. There is also provided a method, computer program product, and/or apparatus for using such data for the purpose of categorizing and/or handling such errors.

In particular, proposed concepts may allow errors occurring in a multi-tenancy integration environment to be analyzed and identify if an elevated level of support is required. For instance, proposed embodiments may facilitate or support the identification of the use of particular area of functionality that is either not currently well-used or not used at all by other users.

By way of example, it is proposed to leverage the declarative nature of integration development to store historical data (for example, to construct a historical database) relating to errors seen for integration flows. An illustrative approach may be summarized as follows:

(I) During development of an integration flow, when an error occurs, the error, along with the state of the flow at that point in time, is saved (potentially with other supplementary information). This may be stored in the form of a flow document. A reference (or link) to a most recent or 'live' version of the flow may also be saved.

(II) Such error data is collected for all users of the system, but is only made available internally to a proposed error handing system/apparatus for decision-making, and thus not exposed to end users.

(III) Responsive to the occurrence of a new error, the new error is compared to the existing stored error data. This comparison can be done by matching the same error in comparable flow documents or parts of flow documents (using known matching techniques).

(IV) Based on such matching, the following can be undertaken:

(a) If there is not a match of a user having the same error developing the same type of integration flow, it can be inferred that this is new usage and the customer needs elevated support.

(b) If there is a match (meaning a previous user writing a similar integration flow experienced the same error), then analysis can be performed regarding whether that previous user's integration flow is now in a state that works and has metrics showing it running successfully. It is possible to do this because both the state of the integration flow when the error occurred and current state of the integration are known (including whether it is successfully running). From this: (i) If the previous user never resolved the error, it can be inferred that no other user has resolved the error and so support is required; or (ii) if the previous user resolved the error and ended up with a running flow, it can be inferred that no extra support is required. For example, no extra support may be required because the user will be able to get it working by walking through the errors and reading the documentation.

A possible extension of such an illustrative embodiment is to provide information regarding how the previous error occurrence was resolved to the new user who has the error.

Accordingly, it is proposed to generate and store data regarding an error occurrence that may be useful for subsequent error handling. The generated and stored data may comprise a flow document which includes: (i) information corresponding to the error; (ii) a current state of the integration when the error occurred; (iii) a link/pointer to the most recent version; and (iv) runtime metrics for the current version. It is further proposed to analyze this data when a new error occurs to decide on a best course of action for solving the new error occurrence.

Embodiments may thus employ a combination of: 1) Using a collection of data and metadata to describe the state of a solution; 2) Associating discrete states of a solution as past and future points on a time line of a single solution; 3) Identifying similarities between two points in the two timelines of two different solutions; 4) Inferring that solution A could reach a similar future to solution B given that the current state of solution A is similar to the prior state of solution B; 5) Provide users (which may be, for example, owners of a solution) with confidence that they can reach success and/or suggestions of the correct path to success; 6) Provide vendors with an indication of pioneering users (which may be, for example, owners of solutions who have a state that does not match any state on any timeline of any prior solution).

According to a proposed embodiment, there is provided a computer-implemented method for a multi-tenant integration environment. Responsive to the occurrence of an error during a state of execution of an integration flow, error data for the error is generated and associated with the error. The error data is then stored in a data storage component (for example, as one or more flow documents). In particular, the error data comprises error state information corresponding to the state of execution of the flow (for example, a first flow document) and target state information corresponding to a target state of execution of the integration flow (for example, a second flow document).

The error state information may comprise a first integration flow document corresponding to the integration flow at the occurrence of the error. Similarly, the target state information may comprise a second integration flow document corresponding to the integration flow at a point in time after the occurrence of the error.

By way of example, the target state of execution may comprise an error-free state of the integration flow that has previously occurred during a different execution of the integration flow. In this way, information regarding a subsequent state, wherein the error has been resolved, may be provided. This may, for instance, indicate how the error may be resolved or overcome.

In particular, the generated error data may further comprise target runtime information identifying one or more runtime metrics for the target state of execution of the integration flow. Runtime metrics for resolving or helping to overcome the error may therefore be provisioned with the error data, thus assisting error resolution.

In some embodiments, the generated error data may further comprise path information corresponding to a path of the integration flow. That is, a path to a desired or preferred later state may be provided to indicate how to handle the error. In some embodiments, the generated error data may further comprise a link to a different version of the integration flow.

Also, in some embodiments, the generated error data may further comprise escalation information corresponding to a severity of the error. For instance, the escalation information may include an indication that the error has not previously occurred or been resolved.

According to another proposed embodiment, there is provided a computer-implemented method for error-handling in a multi-tenant integration environment. In response to the occurrence of an error during a state of execution of an integration flow, the method identifies the error and the state of execution of the flow. The method then obtains historical error data associated with a previous occurrence of the identified error. The historical error data comprises error data generated according to a proposed embodiment (such as that detailed above, for example). That is, the historical error data comprises error state information corresponding to the state of execution of the integration flow at the previous occurrence of the identified error and target state information corresponding to a target state of execution of the integration flow. The method analyzes the obtained historical error data based on the state of execution of the flow and categorizes the error into at least one of plurality of error categories based on the analysis results.

By way of further example, the obtained historical error data may further comprise an indication that the error has not previously occurred or been resolved. The process of categorizing the error may then comprise identifying that the obtained historical error data comprises an indication that the error has not previously occurred or been resolved and then categorizing the error into a first error category associated with a first set of support requirements (for example, an 'unresolved error' category that is associated with increased support needs).

In some embodiments, obtaining historical error data associated with a previous occurrence of the identified error may comprise searching a collection of stored historical error data (such as flow documents) associated with a plurality of previous occurrences of one or more errors to identify historical error data associated with a previous occurrence of the identified error.

Embodiments of the present disclosure may thus assist in the construction/design of an integration flow. In particular, embodiments may compare a current integration flow that is seeing an error with previous flows that are similar and experienced the same error. From this, it can be inferred or determined what a final working (for example, error-free) integration flow might look like. Embodiments may also provide an alert or indication if the error currently being seen has never been seen by another user who then subsequently changed the flow to work correctly and ran it repeatedly over the course of time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
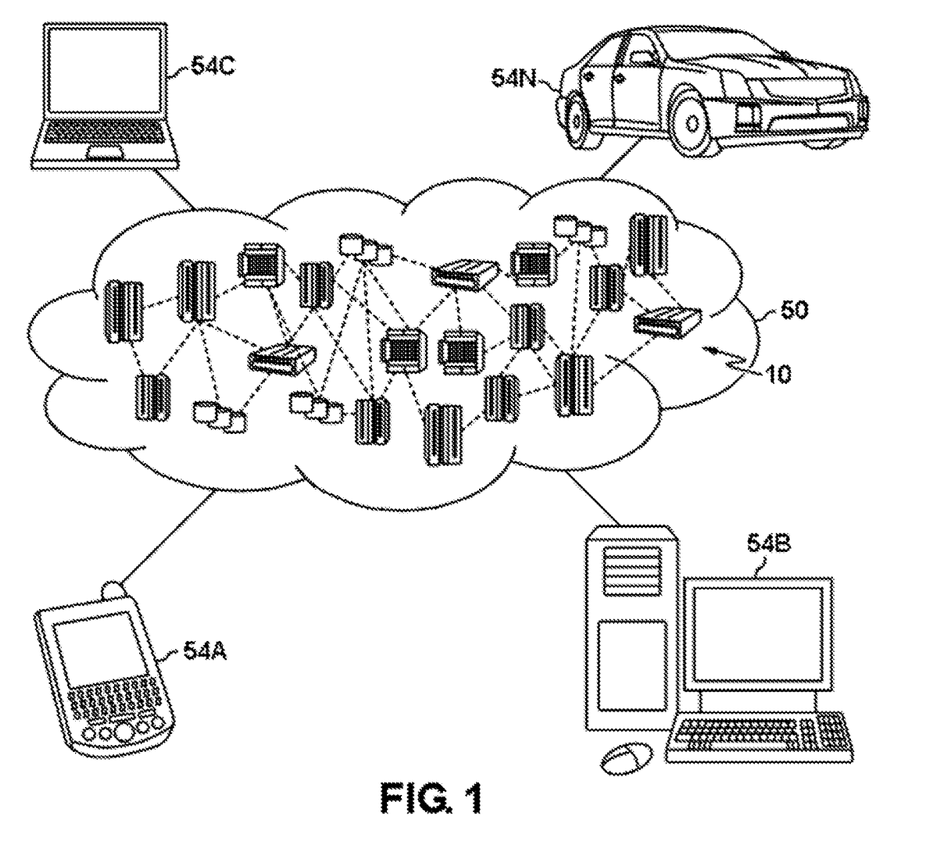
FIG. 1 depicts a cloud computing environment, in accordance with embodiments of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
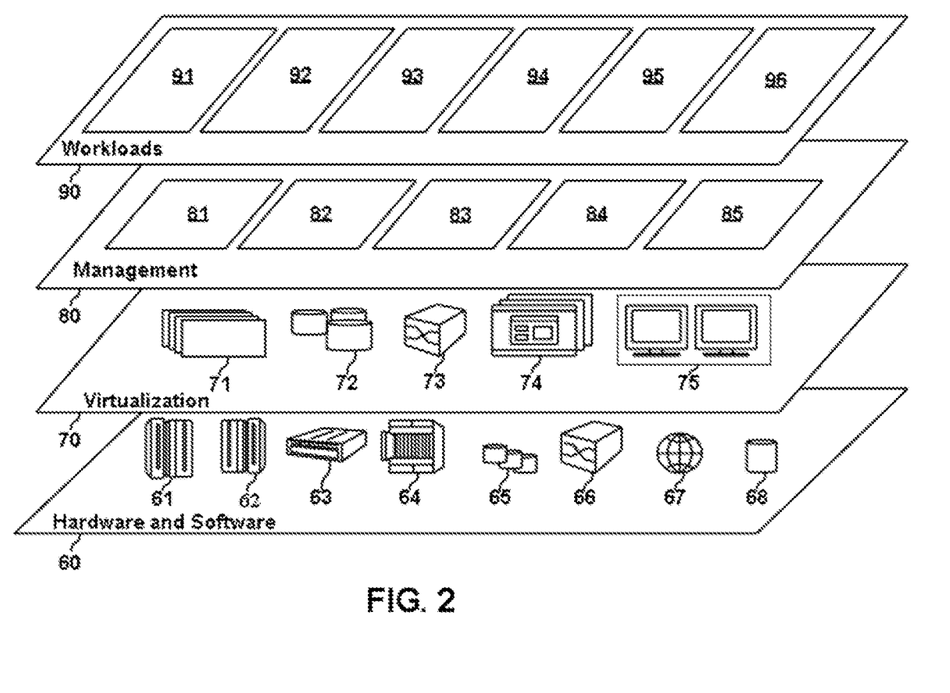
FIG. 2 depicts abstraction model layers, in accordance with embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Error handling 85 provides for handling errors according to proposed concepts as detailed herein.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only illustrative and not intended to assert or imply any limitation with regard to the environments in which aspects or embodiments of the present invention may be implemented. Many modifications to the depicted environments may be made without departing from the spirit and scope of the present invention. Moreover, an apparatus or system embodying one or more of the proposed concepts may take the form of any of a number of different processing devices including client computing devices, server computing devices, a tablet computer, laptop computer, telephone or other communication devices, personal digital assistants (PDAs), or the like. In some illustrative examples, an off-premise device and an on-premise device may comprise a portable computing device that is configured with flash memory to provide non-volatile memory for storing operating system files and/or user-generated data, for example. Thus, the system may essentially be any known or later-developed processing system without architectural limitation.

Embodiments of the present disclosure may enhance a system by providing an apparatus or method that supports error-handling in a multi-tenant integration environment. Such embodiments can extend or improve the integration flow development and/or resource allocation capabilities.

As used herein, the term "flow" refers to a set of actions which are connected together to achieve a task. For example, a flow could be an integration in which the input to one system or application is connected to a call to another system. As used herein, the term "running flow" refers to a flow that is running, or has run, on the system that is adapted to run a plurality of flows. Typically, a version of a flow (which may also be referred to as a particular instance of a flow) is represented by a flow document, which corresponds to the flow of data and/or actions for that version/instance. Such a flow document can be interpreted by a particular runtime to identify a set of definitions, actions, and/or instructions which describe an instance of a flow at/in a particular state.

Figure 3:
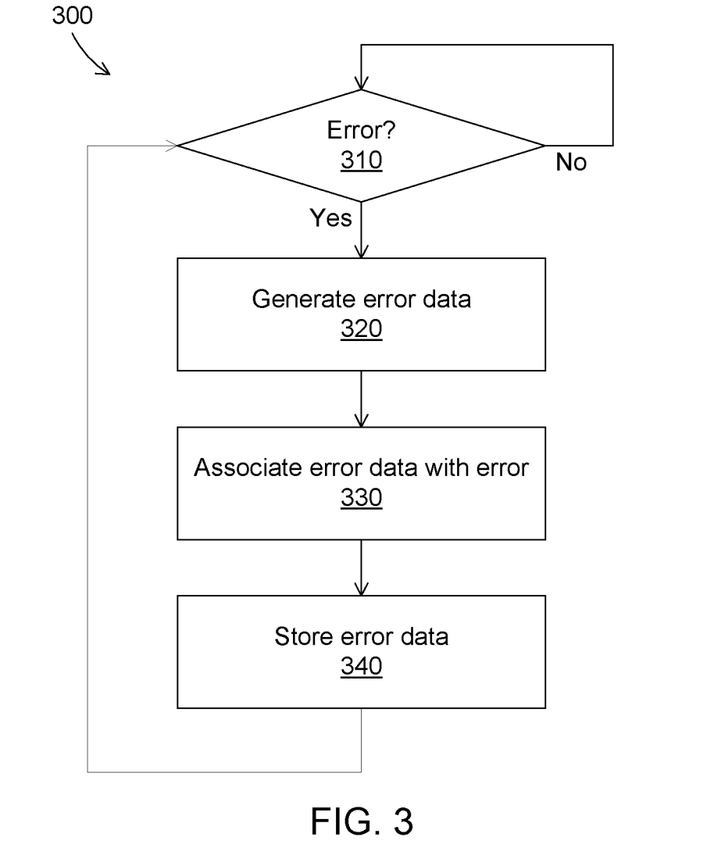
FIG. 3 shows a flow diagram of a method for a multi-tenant integration environment, in accordance with embodiments of the present disclosure.

To aid understanding of the embodiments disclosed herein, FIG. 3 shows a flow diagram of a method 300 for a multi-tenant integration environment according to an illustrative embodiment. The method 300 begins at operation 310, which includes determining whether there is an occurrence of an error. If no error has occurred, the method 300 loops back to operation 310 to repeat the check for an error. In contrast, if it is determined at operation 310 that an error has occurred, the method 300 proceeds to operation 320. In this way, the method 300 continually monitors for the occurrence of any error, and proceeds to operation 320 responsive to the occurrence of an error during a state of execution of an integration flow.

Operation 320 comprises generating error data for the error. In this illustrative embodiment, the generated error data comprises error state information corresponding to the state of execution of the flow (in the form of a flow document). The generated error data also comprises target state information corresponding to a target state of execution of the integration flow (in the form of a flow document). Specifically, in this example, the target state of execution comprises a flow document describing an error-free state of the integration flow that has previously occurred during a different execution of the integration flow.

The generated error data further comprises target runtime information identifying one or more runtime metrics for the target state of execution of the integration flow. In this example, the generated error data further comprises path information corresponding to a path of the integration flow. The generated error data also comprises escalation information corresponding to a severity of the error. For instance, the escalation information of this embodiment comprises an indication that the error has not previously occurred or been resolved.

It will therefore be understood that, responsive to the occurrence of an error during a state of execution of an integration flow, the illustrative method 300 is configured to generate various forms of data corresponding to various aspects of the error and/or the integration flow. This error data may be thought of as being similar to metadata (e.g., supplementary or additional data).

At operation 330, the generated error data is associated with the error (for example, using a reference or link which provides an association between the error and the generated error data). The error data is then stored in a data storage component at operation 340.

Figure 4:
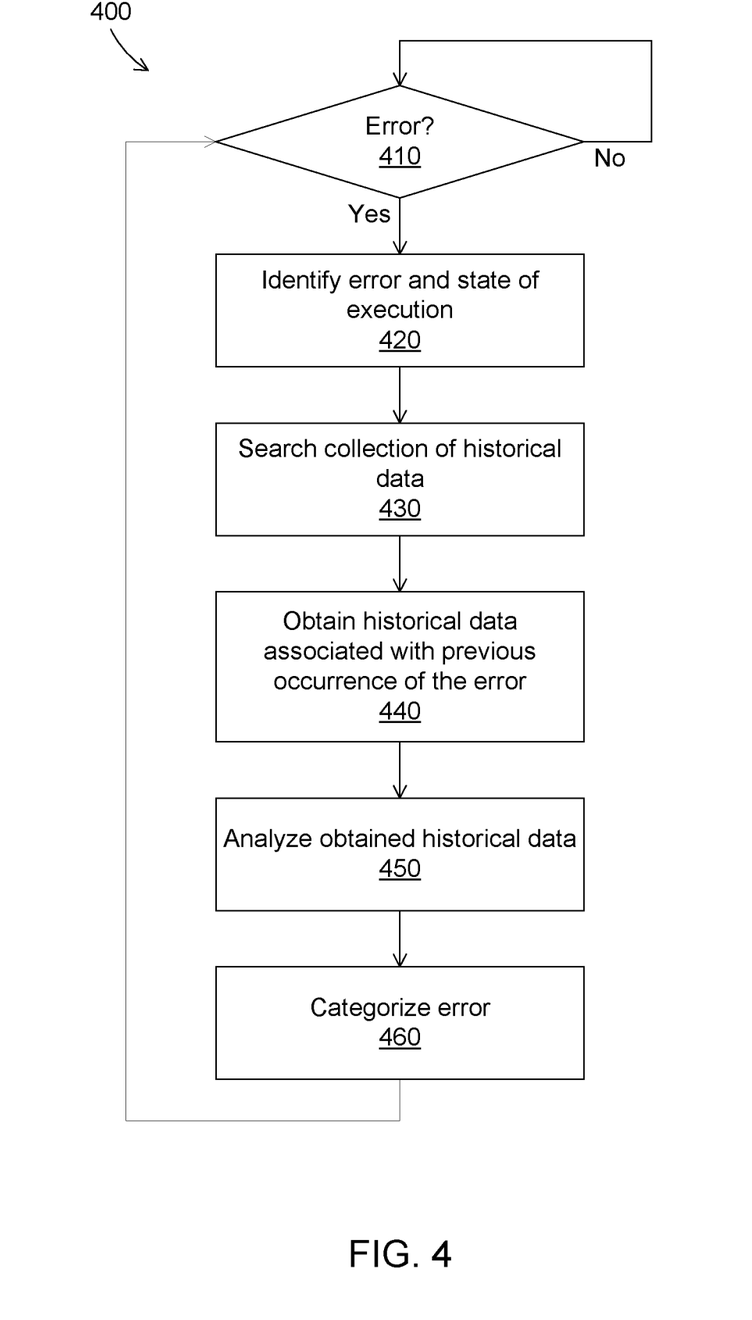
FIG. 4 shows a flow diagram of a method for error handling in a multi-tenant integration environment, in accordance with embodiments of the present disclosure.

FIG. 4 shows a flow diagram of a method 400 for error-handling in a multi-tenant integration environment according to an illustrative embodiment of the present disclosure. The method begins at operation 410, which includes determining whether there is an occurrence of an error. If it is determined at operation 410 that no error has occurred, the method 400 loops back to operation 410 to repeat the check for an error. In contrast, if it is determined at operation 410 that an error has occurred, the method 400 proceeds to operation 420. In this way, the method 400 continually monitors for the occurrence of any error, and proceeds to operation 420 responsive to the occurrence of an error during a state of execution of an integration flow.

Operation 420 comprises identifying the error and the state of execution of the flow. Then, at operation 430, a collection of historical error data associated with previous error occurrences is searched to identify historical error data for a previous error matching (or similar to) the (new/current) error. The collection of historical error data comprises error data that has been previously generated and stored for previous occurrences according to the method of FIG. 3 described above. That is, error data generated according to the embodiment of FIG. 3 is stored as a collection (for example, as a database) that is searched in operation 430 to find historical error data for a previous error equivalent (or a previous error that is highly similar) to the identified error.

At operation 440, identified/found historical error data associated with a previous occurrence of the error is then obtained. In accordance with at least one embodiment of the present disclosure, operation 440 can include, for example, retrieving such historical error data from the collection/database.

The obtained historical error data is then analyzed at operation 450 based on the state of execution of the flow. Based on the results of the analysis, the error is categorized in an error category at operation 460. For example, if analysis of the obtained historical error data determines that the error has not been previously resolved or overcome, the error may be assigned to a 'unresolved error' category that is associated with increased support needs and/or the provision of a warning message. Conversely, if analysis of the obtained historical error data determines that the error has been previously resolved or overcome, the error may be assigned to 'resolved error' category that is associated with reduced support needs and/or the provision of instructions for resolving/overcoming the error.

Figure 5:
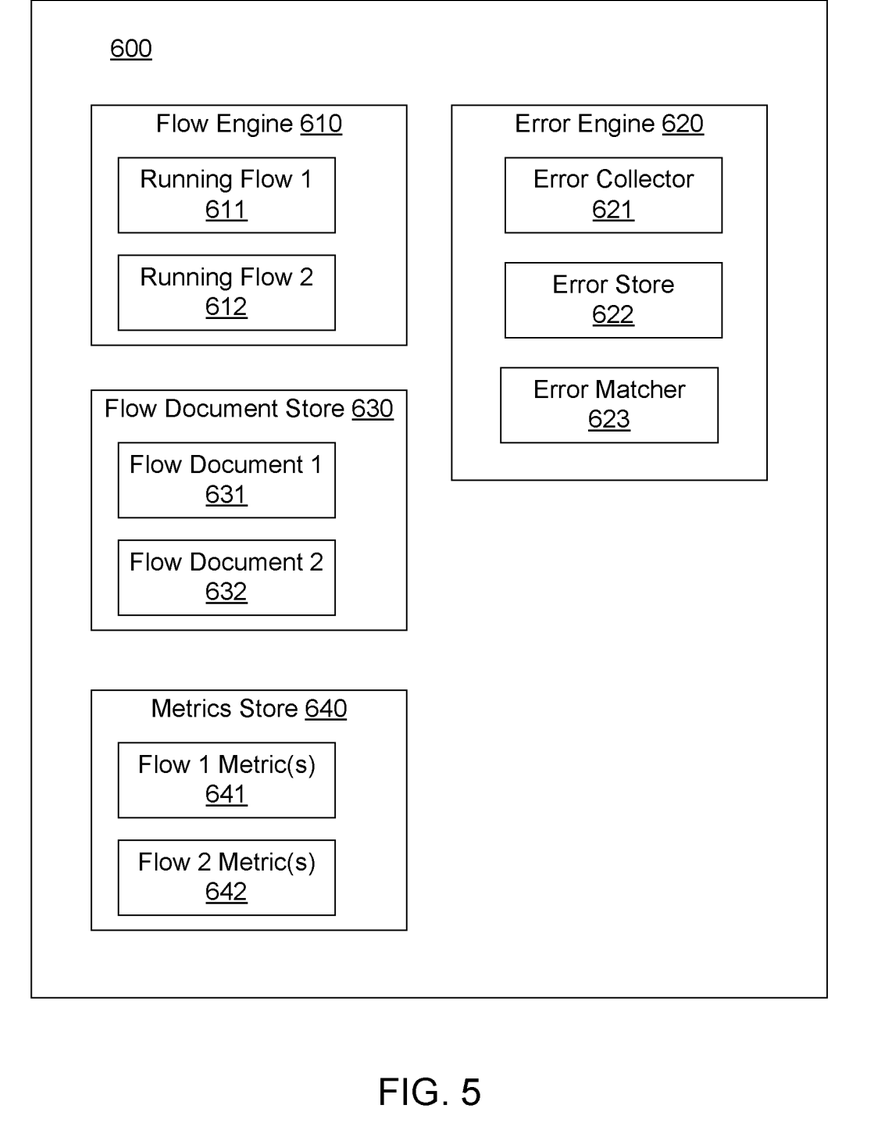
FIG. 5 shows a block diagram of a system, in accordance with embodiments of the present disclosure.

FIG. 5 shows a block diagram depicting a system 600 for recording and matching errors with respect to a multi-tenant cloud-based system, in accordance with at least some embodiments of the present disclosure.

Here, the system 600 is a modified version of a conventional integration flow development system, wherein the modification results in the addition of an error engine 620. That is, the system 600 comprises a flow engine 610, a flow document store 630, and a metrics store 640, all of which may already be provisioned as part of a conventional system, and further comprises an error engine 620, which is a new, additional component.

The flow engine 610 is configured to run integration flows. Running integration flows is also commonly referred to as executing integration flows. The flow engine 610 also makes use of other components, like connectors, when running, which are not shown. By way of illustration, first running flow 611 (also referred to herein as "Running Flow 1") and second running flow 612 (also referred to herein as "Running Flow 2") are depicted as being run in the flow engine 610. These will be used to demonstrate how an error in an integration flow may be handled by the error engine 620 according to embodiments of the present disclosure.

The error engine 620 is used to both collect and analyze errors in the system and to then perform follow-on actions based on the analysis results. The error engine 620 comprises an error collector 621, which is a component that is configured to detect when an error occurs and collect information for generating error data in accordance with proposed concepts. The generated error data is stored in an error store 622 (for example, a data storage component) of the error engine 620. Accordingly, errors and their associated error data are stored by the error store 622. The error engine 620 also comprises an error matcher 623, which is a component that is configured to take a newly occurring error (also referred to herein as a new error occurrence) and try to match it to one or more errors in the error store 622.

The flow document store 630 is a data storage component that is configured to store the latest copy of all integration flow documents. By way of illustration, first flow document 631 (also referred to herein as "Flow Document 1") and second flow document 632 (also referred to herein as "Flow Document 2") are depicted as being stored in the flow document store 630. The first flow document 631 ("Flow Document 1") corresponds to the first running flow 611 ("Running Flow 1"). The second flow document 632 ("Flow Document 2") corresponds to the second running flow 612 ("Running Flow 2"). These will trigger an error in the illustrative examples set forth below.

The metrics store 640 is a data storage component that is configured to store metrics about a flow. By way of illustration, first metric(s) 641 (also referred to herein as "Flow 1 Metric(s)") and second metric(s) 642 (also referred to herein as "Flow 2 Metric(s)") are depicted as being stored in the metrics store 640. The first metrics 641 ("Flow 1 Metric(s)") correspond to the first running flow 611 ("Running Flow 1"). The second metrics 642 ("Flow 2 Metric(s)") correspond to the second running flow 612 ("Running Flow 2").

Provided only as a means of illustration, a summary of an example operation of the system 600 is as follows:

(i) The first running flow 611 hits an error when being run by a user.

(ii) The error collector 621 detects the error and collects the following information: the first flow document 631 (from the flow document store 630); a link to the first flow document 631, which points to the most recent version of the first flow document 631; the location at which the error occurred; and context for the error (for example, error number and error inserts).

(iii) The error collector 621 stores the collected data/information in the error store 622, indexed by the error context.

(iv) The error matcher 623 is triggered and searches the error store 622 for all other errors that match. For each matching error, the error matcher 623 compares the first flow document to the stored flow document to check for a match. It can also use the location in the flow document as part of this matching process and/or also only require part of the document at that location to match.

(v) By way of a first scenario, if there is no match and the error engine 620 then takes an action responsive to the lack of a match, the action could include one or more of the following:

alert an operations team to assist the customer to resolve the error (on the inference that the error appears to have not been encountered before and hence be untested).
  alert the customer that support should be requested.
  record that a new error situation has occurred that might need investigation.

(vi) By way of a second scenario, if the customer subsequently got the first running flow 611 working and running correctly, first flow metrics 641 ("Flow 1 Metric(s)") will then be stored to indicate that the first flow is running and for how long and for how many messages.

(vii) A new customer then comes along with second running flow 612 and hits the same error.

(viii) The error collector 621 collects the same data again for this new error.

(ix) The error matcher 623 then detects that the same error has occurred before and then attempts to match the flow documents. If they do not match, then operation of the system 600 continues by returning to item (v) above for the first running flow 611. If they do match, then operation of the system 600 continues in the following manner. (a) The error engine 620 retrieves the first flow metrics 641 for first running flow 611 and determines whether the user got the flow running successfully. (b) There is no need to escalate this error to support as it is inferred that other customers have successfully resolved this before, and it is a normal error during the process of development. Further, information may be provided to the current user experiencing the error to indicate what the correct flow looks like. (c) If the first flow metrics 641 indicate that it has never worked, then operation of the system 600 continues by returning back to item (v) above, as before.

From the above description, it will be appreciated that the present disclosure may provide one or more embodiments to generate data about errors encountered in an integration environment. Additionally, or alternatively, it will be appreciated that the present disclosure may provide one or more embodiments to handle errors in an integration environment, based on such generated data.

Although the present disclosure has been described in the context of an integration, it should be appreciated that one or more aspects of the present disclosure may also be applicable to other any programmable software systems.

In accordance with at least one embodiment of the present disclosure, a processing system comprises at least one processor and a computer program product. The computer program product is configured for error-handling in a multi-tenant integration environment. The computer program product includes a computer readable storage medium having program instructions embodied therewith, and the program instructions are executable by a processing unit to cause the processing unit to perform a method. The method includes, responsive to the occurrence of an error during a state of execution of an integration flow, identifying the error and the state of execution of the flow. The method further includes obtaining historical error data associated with a previous occurrence of the identified error. The historical error data comprises: (i) error state information corresponding to the state of execution of the integration flow at the previous occurrence of the identified error; and (ii) target state information corresponding to a target state of execution of the integration flow. The method further includes analyzing the obtained historical error data based on the state of execution of the flow and categorizing the error into at least one of plurality of error categories based on the analysis results. The at least one processor is adapted to execute the computer program code of said computer program product.

In accordance with at least one embodiment of the present disclosure, an apparatus is configured for use in a multi-tenant integration environment. The apparatus includes a data generation component configured, responsive to the occurrence of an error during a state of execution of an integration flow, to generate error data for the error. The apparatus further includes an association component configured to associate the error data with the error. The apparatus further includes a data storage component configured to store the error data. The error data comprises: (i) error state information corresponding to the state of execution of the flow; and (ii) target state information corresponding to a target state of execution of the integration flow.

In accordance with at least one embodiment of the present disclosure, the error state information comprises a first integration flow document corresponding to the integration flow at the occurrence of the error. In accordance with at least one embodiment of the present disclosure, the target state information comprises a second integration flow document corresponding to the integration flow at a point in time after the occurrence of the error.

In accordance with at least one embodiment of the present disclosure, the target state of execution comprises an error-free state of the integration flow that has previously occurred during a different execution of the integration flow.

In accordance with at least one embodiment of the present disclosure, the generated error data further comprises target runtime information identifying one or more runtime metrics for the target state of execution of the integration flow.

In accordance with at least one embodiment of the present disclosure, the generated error data further comprises path information corresponding to a path of the integration flow.

In accordance with at least one embodiment of the present disclosure, the generated error data further comprises escalation information corresponding to a severity of the error. In accordance with at least one embodiment of the present disclosure, the escalation information comprises an indication that the error has not previously occurred or been resolved.

In accordance with at least one embodiment of the present disclosure, the generated error data further comprises a link to a different version of the integration flow.

In accordance with at least one embodiment of the present disclosure, an apparatus is configured for error-handing in a multi-tenant integration environment. The apparatus includes an error analysis component configured, responsive to the occurrence of an error during a state of execution of an integration flow, to identify the error and the state of execution of the flow. The apparatus further includes an interface component configured to obtain historical error data associated with a previous occurrence of the identified error, wherein the historical error data comprises: (i) error state information corresponding to the state of execution of the integration flow at the previous occurrence of the identified error; and (ii) target state information corresponding to a target state of execution of the integration flow. The apparatus further includes an analysis component configured to analyze the obtained historical error data based on the state of execution of the flow and to categorize the error into at least one of plurality of error categories based on the analysis results.

In accordance with at least one embodiment of the present disclosure, the obtained historical error data further comprises an indication that the error has not previously occurred or been resolved. In accordance with at least one embodiment of the present disclosure, the analysis component is configured to identify that the obtained historical error data comprises an indication that the error has not previously occurred or been resolved. In accordance with at least one embodiment of the present disclosure, the analysis component is further configured to categorize the error into a first error category associated with a first set of support requirements.

In accordance with at least one embodiment of the present disclosure, the interface component is configured to search a collection of stored historical error data associated with a plurality of previous occurrences of one or more errors to identify historical error data associated with a previous occurrence of the identified error.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
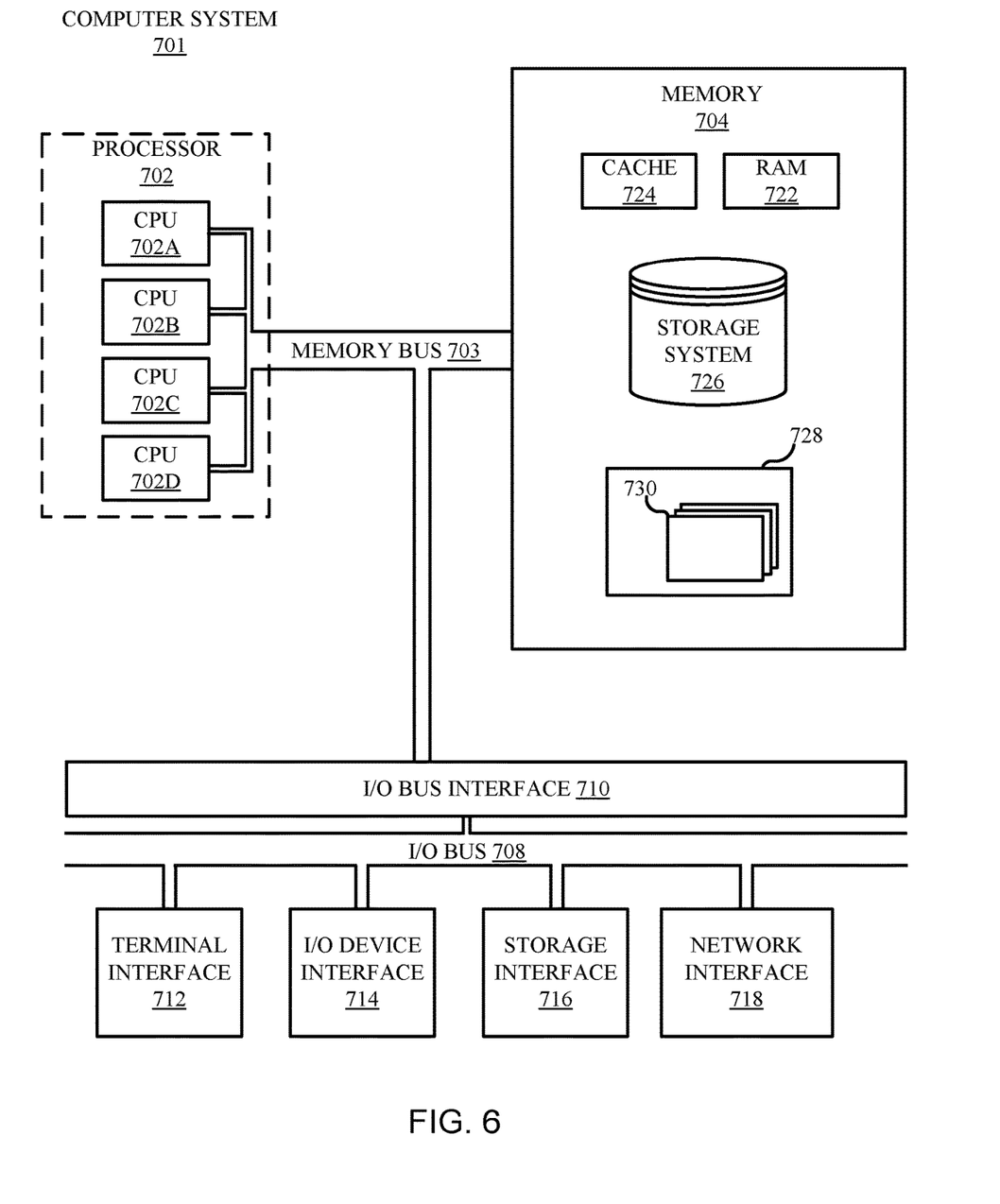
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 6 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 701. In some embodiments, however, individual components may have greater or lesser complexity than as represented in FIG. 6, components other than or in addition to those shown in FIG. 6 may be present, and the number, type, and configuration of such components may vary.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for error-handling in a multi-tenant integration environment, the method comprising:
   in response to an error occurring during a state of execution of an integration flow, generating error data for the error;
   associating the generated error data with the error; and
   storing the generated error data in a data storage component,
   wherein the generated error data comprises:
      error state information corresponding to the state of execution of the integration flow; and
      target state information corresponding to a target state of execution of the integration flow.

2. The method of claim 1, wherein:
   the error state information comprises a first integration flow document corresponding to the integration flow at the occurrence of the error, and
   the target state information comprises a second integration flow document corresponding to the integration flow at a point in time after the occurrence of the error.

3. The method of claim 1, wherein the target state of execution comprises an error-free state of the integration flow that has previously occurred during a different execution of the integration flow.

4. The method of claim 1, wherein the generated error data further comprises target state runtime information identifying at least one runtime metric for the target state of execution of the integration flow.

5. The method of claim 1, wherein the generated error data further comprises path information corresponding to a path of the integration flow.

6. The method of claim 1, wherein the generated error data further comprises escalation information corresponding to a severity of the error.

7. The method of claim 6, wherein the escalation information comprises an indication that the error has not previously occurred or been resolved.

8. The method of claim 1, wherein the generated error data further comprises a link to a different version of the integration flow.

9. A computer-implemented method for error-handling in a multi-tenant integration environment, the method comprising:
   in response to an error occurring during a state of execution of an integration flow, identifying the error and the state of execution of the flow;
   obtaining historical error data associated with a previous occurrence of the identified error, wherein the historical error data comprises:
      error state information corresponding to the state of execution of the integration flow at the previous occurrence of the identified error; and
      target state information corresponding to a target state of execution of the integration flow;
   analyzing the obtained historical error data based on the state of execution of the flow; and
   categorizing the error into at least one of plurality of error categories based on results of the analysis.

10. The method of claim 9, wherein:
   the obtained historical error data includes at least one of an indication that the error has not previously occurred or an indication that the error has not previously been resolved, and
   categorizing the error includes:
      identifying that the obtained historical error data comprises an indication that the error has not previously occurred or been resolved; and
      categorizing the error into a first error category associated with a first set of support requirements.

11. The method of claim 9, wherein obtaining historical error data associated with a previous occurrence of the identified error comprises:
  searching a collection of stored historical error data associated with a plurality of previous occurrences of one or more errors to identify historical error data associated with a previous occurrence of the identified error.

12. The method of claim 9, further comprising:
  collecting the historical error data associated with the previous occurrence of the identified error, including:
    in response to a particular previous occurrence of the identified error, generating the historical error data for the particular previous occurrence of the identified error;
    associating the generated historical error data with the particular previous error; and
    storing the generated historical error data in a data storage component.

13. A computer program product for a multi-tenant integration environment, the computer program product comprising a computer readable storage medium having program instructions embodied therewith, the program instructions executable by a processing unit to cause the processing unit to perform a method comprising:
  in response to an error occurring during a state of execution of an integration flow, generating error data for the error;
  associating the generated error data with the error; and
  storing the generated error data in a data storage component,
  wherein the generated error data comprises:
    error state information corresponding to the state of execution of the integration flow; and
    target state information corresponding to a target state of execution of the integration flow.

14. The computer program product of claim 13, wherein:
  the error state information comprises a first integration flow document corresponding to the integration flow at the occurrence of the error, and
  the target state information comprises a second integration flow document corresponding to the integration flow at a point in time after the occurrence of the error.

15. The computer program product of claim 13, wherein the target state of execution comprises an error-free state of the integration flow that has previously occurred during a different execution of the integration flow.

16. The computer program product of claim 13, wherein the generated error data further comprises target runtime information identifying at least one runtime metric for the target state of execution of the integration flow.

17. The computer program product of claim 13, wherein the generated error data further comprises path information corresponding to a path of the integration flow.

18. The computer program product of claim 13, wherein the generated error data further comprises escalation information corresponding to a severity of the error.

19. The computer program product of claim 18, wherein the escalation information comprises an indication that the error has not previously occurred or been resolved.

20. The computer program product of claim 13, wherein the generated error data further comprises a link to a different version of the integration flow.

* * * * *